United States Patent
Benedetto et al.

(10) Patent No.: US 12,141,848 B2
(45) Date of Patent: Nov. 12, 2024

(54) TIME-RESTRICTED OWNERSHIP OF NFTS

(71) Applicant: Sony Interactive Entertainment Inc., Tokyo (JP)

(72) Inventors: Warren Benedetto, San Mateo, CA (US); Steven Trombetta, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/393,010

(22) Filed: Aug. 3, 2021

(65) Prior Publication Data

US 2023/0041807 A1    Feb. 9, 2023

(51) Int. Cl.
*G06Q 30/0601* (2023.01)
*G06F 3/0484* (2022.01)
*G06F 9/451* (2018.01)
*G06Q 20/12* (2012.01)
*G06Q 30/0645* (2023.01)
*G06Q 20/38* (2012.01)

(52) U.S. Cl.
CPC ....... *G06Q 30/0611* (2013.01); *G06F 3/0484* (2013.01); *G06F 9/451* (2018.02); *G06Q 20/1235* (2013.01); *G06Q 30/0643* (2013.01); *G06Q 30/0645* (2013.01); *G06Q 20/389* (2013.01)

(58) Field of Classification Search
CPC ........... G06Q 20/1235; G06Q 30/0643; G06Q 30/0645
See application file for complete search history.

(56) References Cited

U.S. PATENT DOCUMENTS

| | | | |
|---|---|---|---|
| 8,645,229 B1* | 2/2014 | Buchheit | G06Q 30/0635 705/26.1 |
| 2009/0198626 A1 | 8/2009 | Neshitov | |
| 2014/0164227 A1 | 6/2014 | Butler et al. | |
| 2016/0055465 A1* | 2/2016 | Rausch | G06Q 30/0601 705/39 |
| 2017/0024818 A1 | 1/2017 | Wager et al. | |
| 2019/0192978 A1* | 6/2019 | Eatedali | A63F 13/79 |
| 2019/0299105 A1* | 10/2019 | Knight | G06Q 20/0658 |
| 2021/0138349 A1* | 5/2021 | Zien | A63F 13/822 |
| 2021/0279305 A1* | 9/2021 | Goldston | G06F 3/0481 |
| 2021/0359996 A1* | 11/2021 | Brown | G06V 20/20 |
| 2022/0222364 A1* | 7/2022 | Roberts | G06F 21/64 |
| 2022/0300966 A1* | 9/2022 | Andon | G06Q 20/3825 |
| 2022/0383303 A1* | 12/2022 | Mullen | G06Q 20/389 |

(Continued)

OTHER PUBLICATIONS

The first exclusive NFT to rent a house in the Hamptons, NY, is now available: VORO real estate collaborates with Otis Pearson. (Mar. 19, 2021). PR Newswire Retrieved from https://dialog.proquest.com/professional/docview/2502937028?accountid=131444 (Year: 2021).*

(Continued)

*Primary Examiner* — Michael Misiaszek
(74) *Attorney, Agent, or Firm* — John L. Rogitz; John M. Rogitz (57) ABSTRACT

A non-fungible token (NFT) representing a computer game asset can be purchased for a limited time by a gamer or a spectator and in some cases extended up to a maximum period, after which time the NFT is placed back on the market.

16 Claims, 7 Drawing Sheets

(56) References Cited

U.S. PATENT DOCUMENTS

2023/0009908 A1* 1/2023 Castinado ............. H04L 9/0819
2023/0034621 A1* 2/2023 Pardo ................... H04L 9/3213

OTHER PUBLICATIONS

ReNFT—Peer to Peer Non-Fungible (NFT) Rentals. Nickev. Oct. 27, 2020. Retrieved from https://medium.com/renftlabs/renft-peer-to-peer-non-fungible-nft-rentals-caa661e5144e (Year: 2020).*
"Inernational Search Report and Written Opinion", dated Aug. 30, 2022, from the counterpart PCT application PCT/US22/25958.
Allinson, Mark, "Non-Fungible Tokens in Video Games", Robotics and Automation News, Apr. 29, 2021.
Musan, Dragos I., "NFT.Finance Leveraging Non-Fungible Tokens", Imperial College London, Department of Computing, Jun. 15, 2020.
Sullivan et al., "What You Don't Know About NFTs Could Hurt You: Non-Fungible Tokens and the Truth About Digital Asset Ownership", Advisories: Media & Entertainment, Mar. 24, 2021.

* cited by examiner

TIME-RESTRICTED OWNERSHIP OF NFTS

FIELD

The present application relates generally to time-restricted ownership of non-fungible tokens (NFTs).

BACKGROUND

Non-fungible tokens (NFT) are the digital world's version of physical collectables, such as but not limited to artwork. An NFT is a digital file in a block chain that proves who owns the underlying digital asset, much as a sales receipt proves ownership of a physical painting, although forging NFT proof-of-ownership is nearly impossible owing to the use of block chain technology. Like a print or painting, ownership of an NFT does not necessarily include copyright in the original work, which copyright may be retained by the creator. While anyone can view the digital asset, only the person identified in the NFT can sell the ownership of the asset, which then is recorded in the block chain. Thus, digital assets can be bought and sold like physical collectables through NFT transactions.

SUMMARY

As understood herein, in some applications, for example, computer simulations such as computer games, an NFT might represent the artwork of an asset in the game, such as a character or weapon or other game asset. As further understood herein, the functionality of the game may be enhanced by enabling gamers and/or spectators to purchase the asset for a limited time.

Accordingly, a system includes at least one computer medium that is not a transitory signal and that in turn instructions executable by at least one processor to associate a time with at least one non-fungible token (NFT) establishing ownership of at least one digital asset, and based at least in part on the time, automatically terminate the ownership. The instructions are executable to offer the NFT for sale subsequent to terminating the ownership.

In example embodiments, the instructions can be executable to present on at least one display at least one user interface (UI) that includes an image of the digital asset, and an offer to own the NFT for a limited time.

In some implementations, the instructions can be executable to present on at least one display at least one UI that includes a selection to indicate a user is a spectator and cost of owning the NFT is a first price, and a selection to indicate a user is a game player and cost of owning the NFT is a second price.

In non-limiting embodiments the instructions can be executable to present on at least one display at least one UI that includes an acceptance selector to indicate accepting terms of ownership of the NFT, and a selector to automatically extend ownership of the NFT past the time for a limited period.

In some examples the instructions can be executable to present on at least one display at least one UI that includes at least one image of the digital asset, and notification of ownership of the digital asset.

In example implementations, the instructions can be executable to present on at least one display at least one UI that includes notification at the elapse of the time that the NFT is back on the market for purchase.

If desired, the instructions can be executable to present on at least one display at least one UI that includes an entry field to enter a bid for the NFT.

The digital asset can include, for example, a computer game asset such as an exclusive skin or emote or other custom artwork that doesn't provide an in-game advantage, for example, a gamer winning an exclusive skin in a tournament, then renting that out for someone else to wear for a period of time such that the gamer can profit. Or, the asset may be a computer game weapon or a computer game character.

In another aspect, a method includes receiving via at least one computer game network at least one user acceptance of an offer for a non-fungible token (NFT) associated with a computer game asset (CGA). The method also includes, responsive to the acceptance, configure the NFT to indicate that a user owns the NFT for a limited period.

In another aspect, an assembly includes at least one display device (DD), at least one computer game controller to control at least one computer game presented on the DD, and at least one processor configured with instructions to enable a user to rent a non-fungible token (NFT) associated with an asset in the computer game for a limited period.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
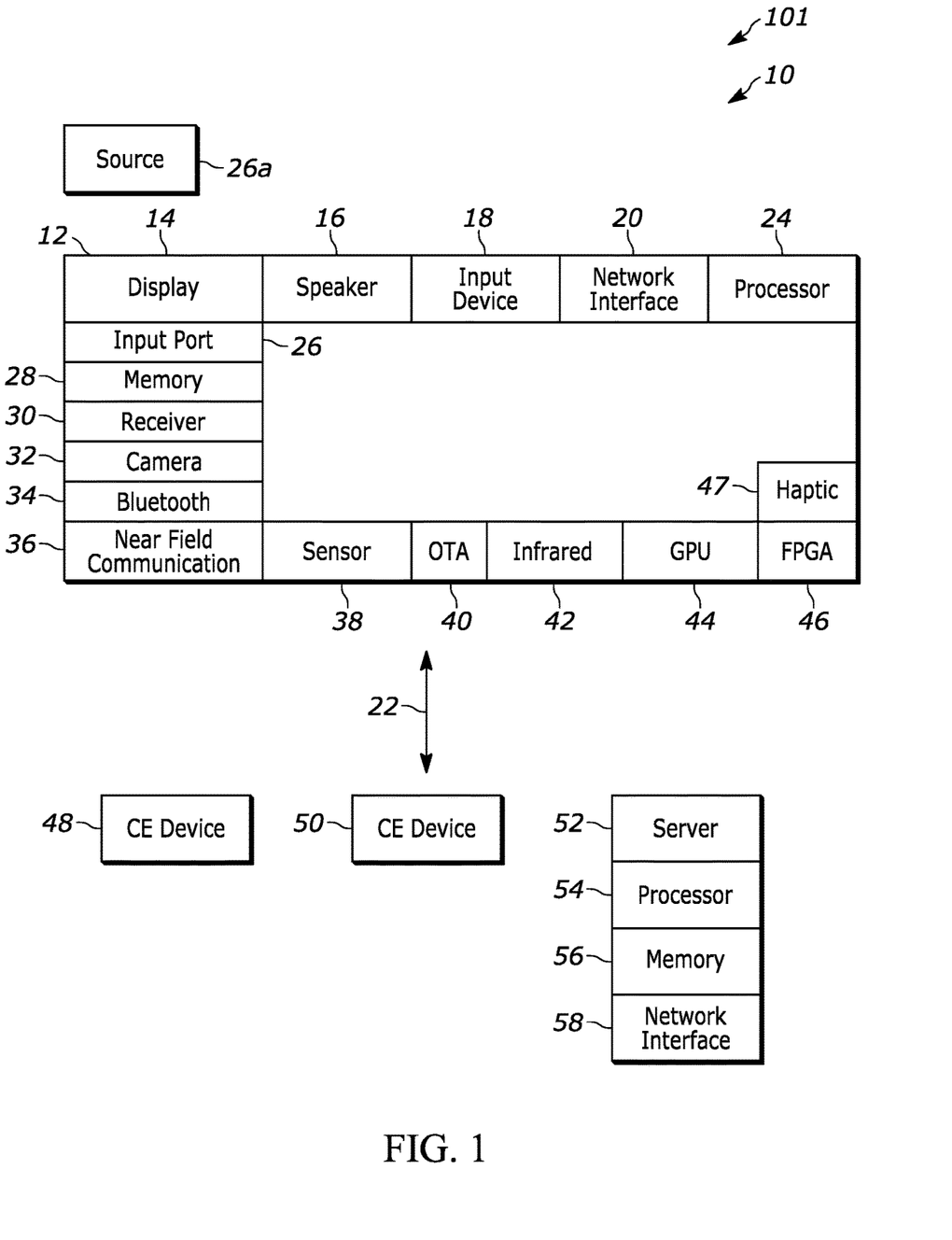
FIG. 1 is a block diagram of an example system including an example in accordance with present principles.

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Figure 2:
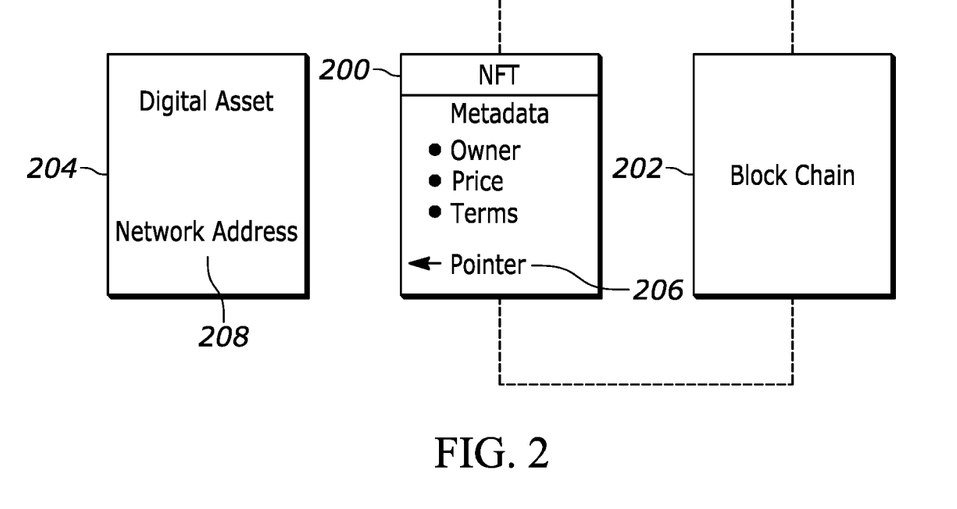
FIG. 2 schematically illustrates an NFT.

FIG. 2 illustrates a data structure 200 configured for inclusion in a block chain 202. The data structure 200 in the embodiment shown is configured as a non-fungible token (NFT) that relates to or is derived from a digital asset 204, such as an image, an audio recording, a game event, or other digitally-embodied asset that typically is generated or composed by an artist. In example implementations, the digital asset 204 may be from a computer simulation, such as a computer game, and may represent an exclusive skin or emote or other custom artwork, a game character, weapon, plot, or other aspect of the computer game such as an event.

In some cases, the digital asset 204 may be encoded as part of the data structure 200 (hereinafter for brevity, "NFT 200") for inclusion into the block chain 202 or may be stored separately from the NFT 200 per se, in which case the NFT 200 may include a pointer 206 to a network address 208 of the digital asset 204.

The NFT 200 typically includes metadata 210 indicating ownership of the NFT 200 and hence of the digital asset 204. The metadata may include indication of the current and if desired past owners of the NFT 200, the price(s) paid for the ownership or other means by which ownership was acquired, the terms of the ownership (e.g., whether copyright does or does not accompany ownership), length of ownership, whether ownership can be transferred during the temporary period of ownership, etc.

Figure 3:
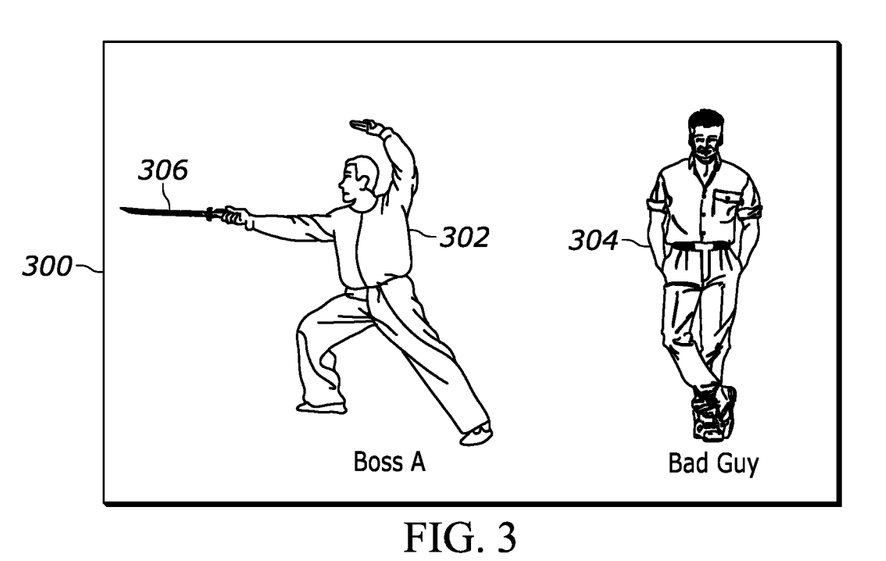
FIGS. 3-9 are screen shots of user interfaces (UI) associated with a limited time NFT offer in a computer game.

Turning now to FIG. 3, a screen shot from an example computer game is shown presented on a display 300 such as any of the displays described herein. In the example shown, a character 302 battles a bad guy character 304. The character 302 is associated with an exclusive skin or emote or other custom artwork 306.

Figure 4:
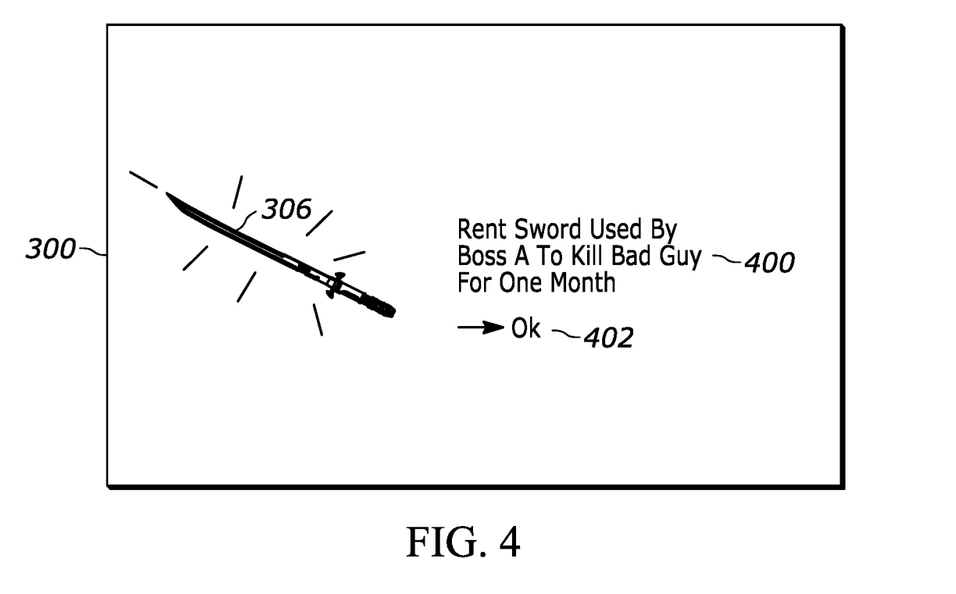

FIG. 4 illustrates that a solicitation 400 may be presented in a UI along with an image of the artwork 306 for a person to rent (equivalently, temporarily own) the NFT (such as the NFT 200 in FIG. 2) associated with the artwork 306. A selector 402 may be presented to accept the solicitation.

Figure 5:
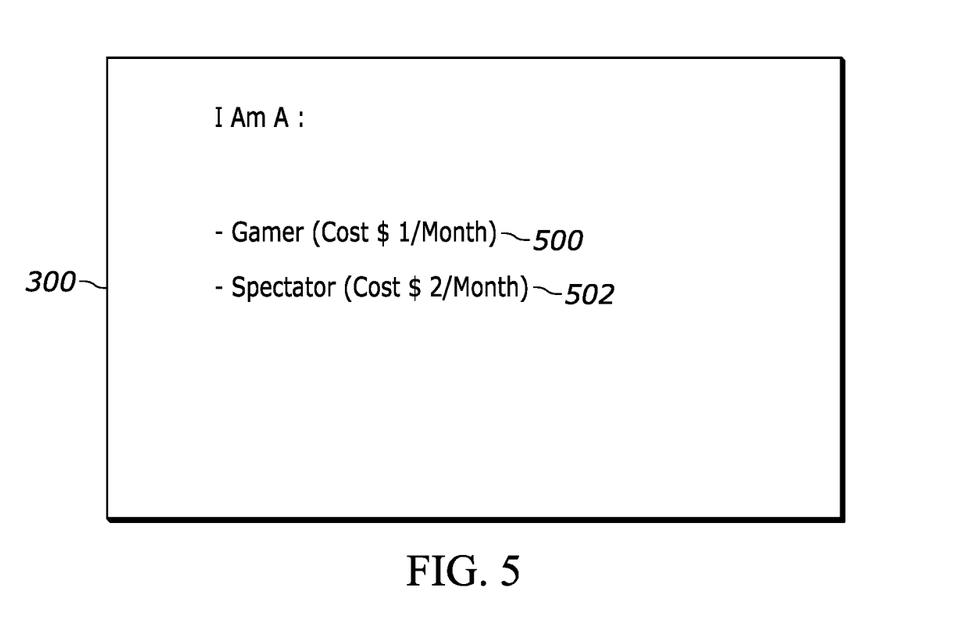

FIG. 5 illustrates that in some embodiments, the cost of temporary ownership of the NFT 200 may differ depending on the attributes of the buyer. In this case, the cost for temporary ownership of the NFT is only $1/month for a gamer (indicated in the illustrated UI at 500), i.e., a player of the game illustrated in FIG. 3, whereas it is $2/month for a spectator of the game (indicated at 502). These are example cost differentials only.

Figure 6:
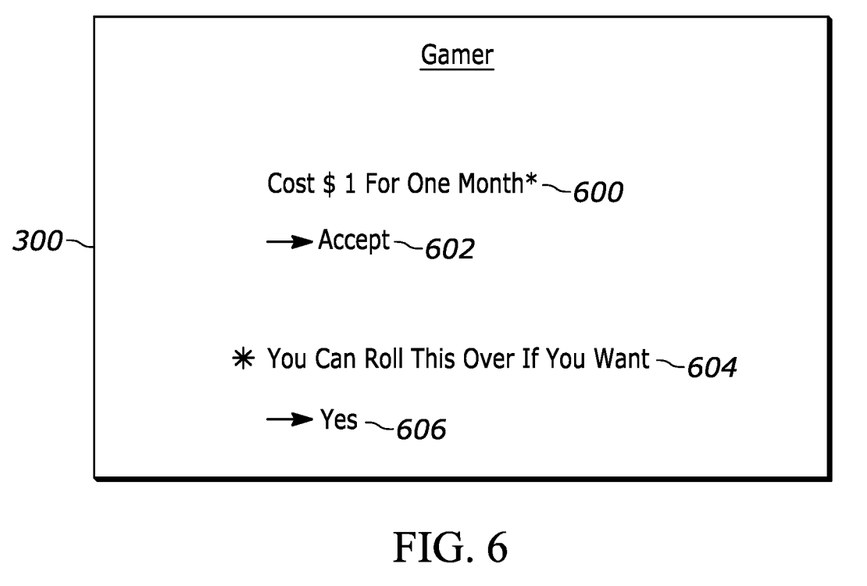

In the case in which the user has indicated "gamer", FIG. 6 illustrates an example UI which repeats at 600 the gamer cost and includes an accept selector 602 to confirm purchase. Also, if desired an option 604 may be presented to select to automatically extend the ownership period for a limited time, along with a selector 606 to invoke automatic extension of ownership.

Figure 7:
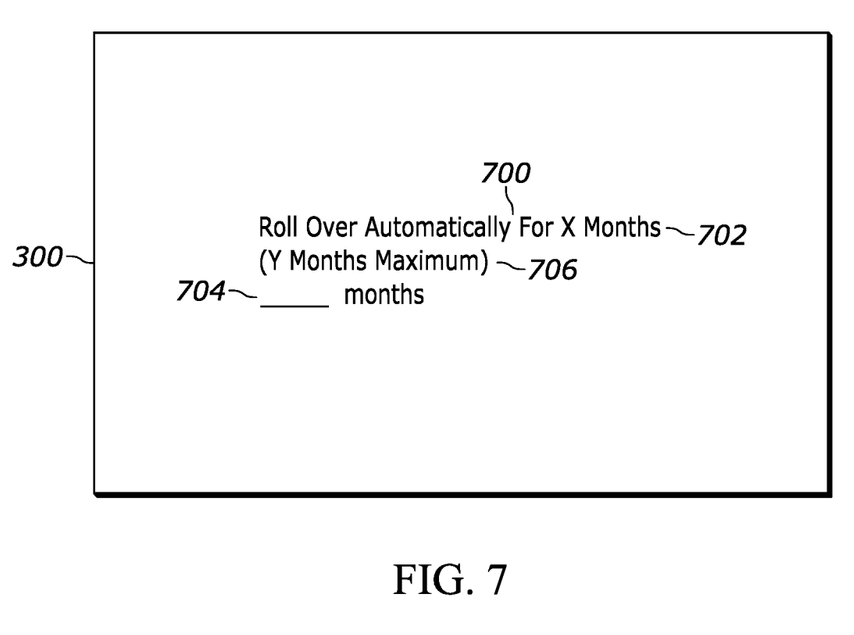

FIG. 7 illustrates a UI in which the user has selected automatic extension from FIG. 6. A prompt 700 indicates the option to automatically extend ownership for a period 702 of X months, or that allows a user to enter a time period for extension in a field 704. The UI may indicate at 706 a maximum length of extension for temporary ownership, after which period elapses the NFT 200 is put back on the market.

Figure 8:
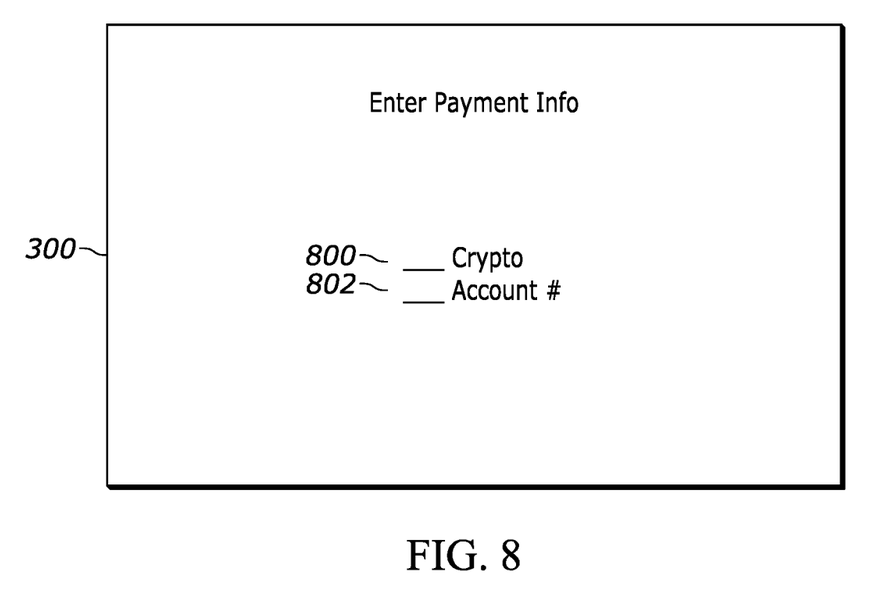

FIG. 8 illustrates a payment UI. The user may select at 800 to pay for temporary ownership of the NFT using cryptocurrency (in effect, paying for a non-fungible token using fungible digital tokens). The user may also select to pay cash using a credit card or debit card at 802.

Figure 9:
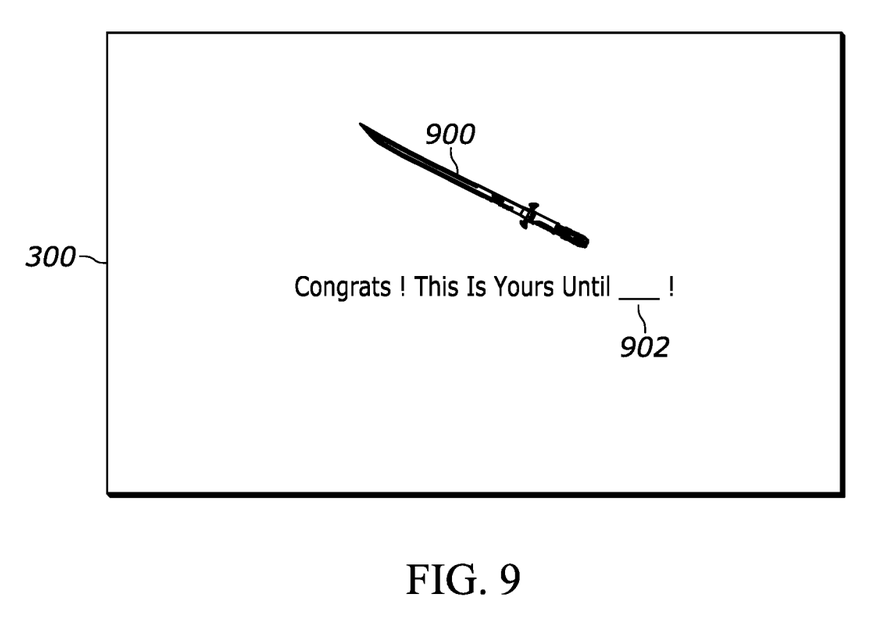

FIG. 9 illustrates a post-payment UI which may present an image 900 of the digital asset associated with the purchased NFT and a congratulatory message indicating at 902 the length of the temporary ownership.

Figure 10:
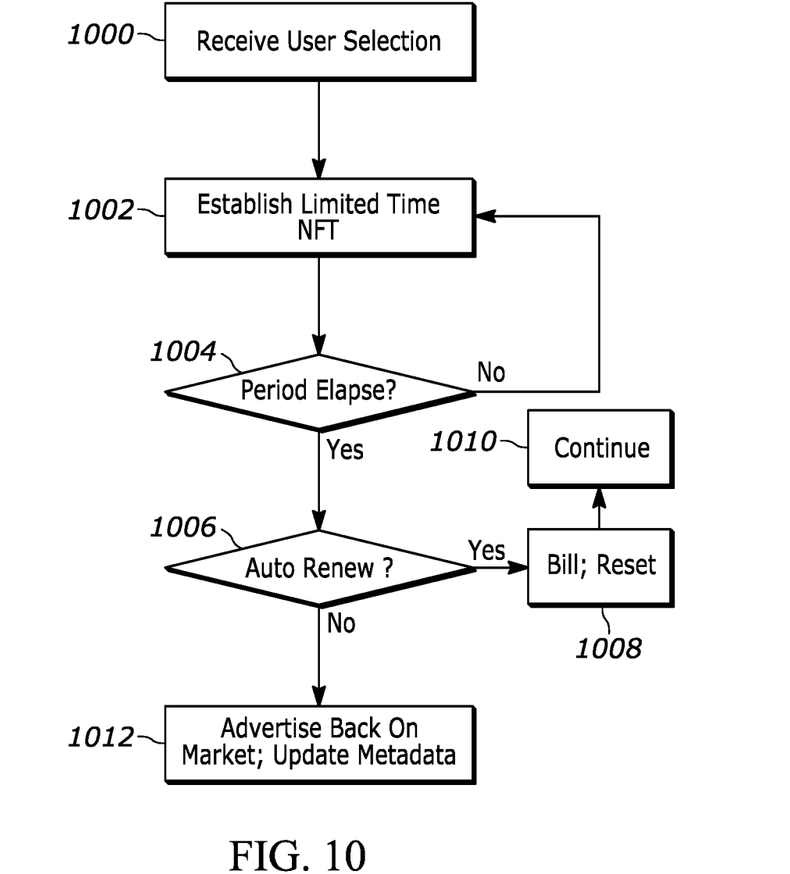
FIG. 10 illustrates example logic in example flow chart format consistent with FIGS. 3-9.

FIG. 10 is a flow chart illustrating example logic consistent with preceding disclosure. Commencing at block 1000, a user selection to purchase the NFT 200 is received. At block 1002 the limited time of ownership of the NFT is established, and the NFT 200 generated in the case of the first sale prior to which the NFT was ever offered.

Proceeding to decision diamond 1004, when it is determined that the period has elapsed, the logic flows to decision diamond 1006 to determine whether the user has selected auto renew. If so, the logic moves to block 1008 to bill the user for the new period of temporary ownership and continues at block 1010 to monitor for elapse of the new period.

On the other hand, once it is determined at state 1006 that no further renewals of the (elapsed) temporary period for ownership remain, the logic moves to block 1012. At block 1012, the logic sends advertisements, e.g., via a computer game network or other network, to other users that the NFT 200 related to the artwork is once again available, updating the metadata in the NFT accordingly.

Figure 11:
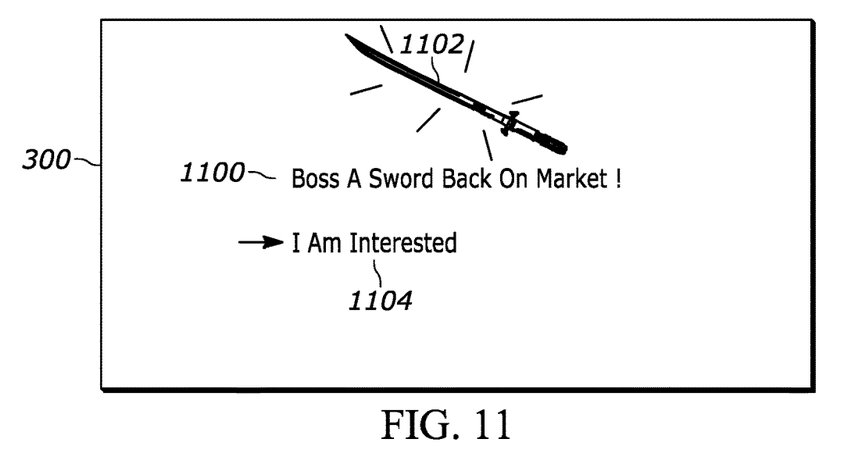
FIG. 11 is a screen of an example UI consistent with the elapse of the NFT ownership period.

FIG. 11 illustrates a UI that renders such an advertisement 1100 along with an image 1102 of the digital asset. A selector 1104 may be presented to indicate that the selecting user is interested, in which case the selecting user may be presented with appropriate ones of the previous UIs to temporarily purchase the NFT.

Figure 12:
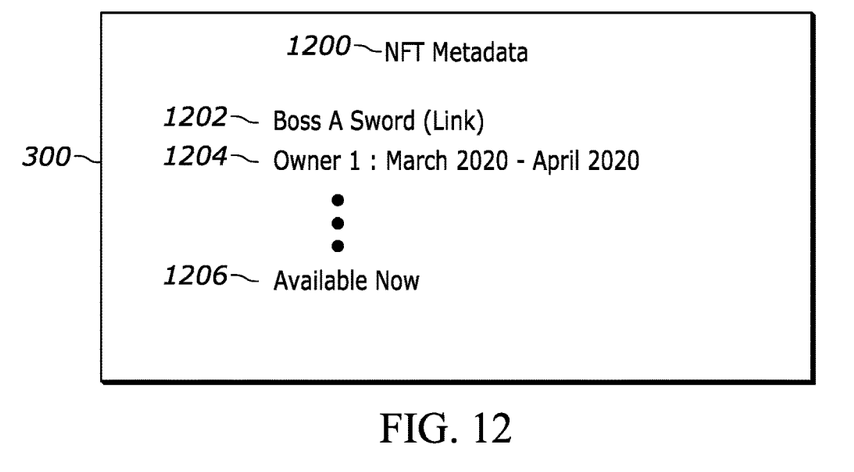
FIG. 12 schematically illustrates a specific NFT consistent with present principles.

FIG. 12 illustrates an example UI presenting NFT metadata 1200. The metadata 1200 may include an indication 1202 of the digital asset associated with the NFT. The metadata 1200 may further include a list 1204 of prior owners of the NFT along with the periods of time the owners possessed the NFT ownership. The UI may also indicate that ownership of the NFT is immediately available (at 1206). In this way, a prospective new buyer viewing prior ownership may be enticed to purchase the NFT.

Figure 13:
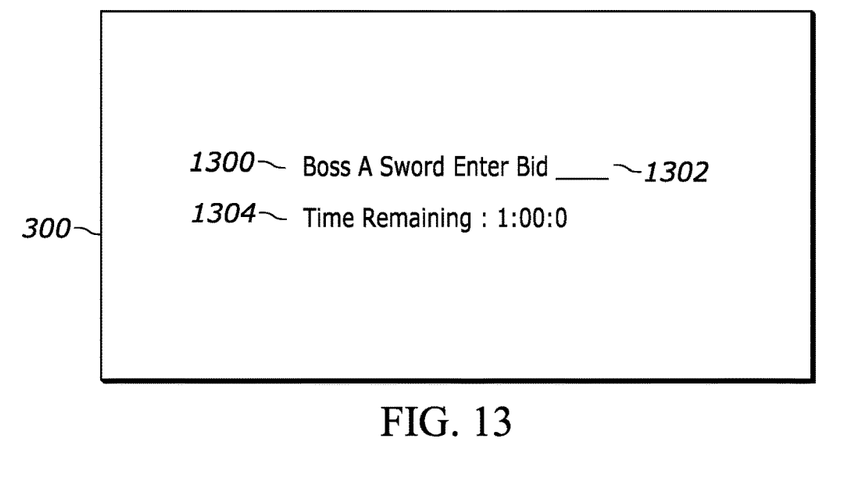
FIG. 13 is a screen of an example UI for bidding for a limited time NFT.

FIG. 13 illustrates a UI that can be presented to indicate at 1300 the digital asset of the NFT. The UI may include a field 1302 into which a user can enter a bid for temporary ownership of the NFT. The UI may indicate at 1304 the time remaining in the auction. Counterbids may be presented if desired to foster a bidding war for the NFT during the course of the bidding period indicated at 1304.

In addition to temporarily purchasing an NFT related to a computer game asset or event, a user can be awarded an NFT for winning a tournament or other feat, such as being an unranked player and defeating a known professional. In addition to above principles, to retain the NFT, the user may be required to play a certain number of hours (either play time or clock time) within a particular period, or the user may be required to employ the underlying asset in a future particular tournament or event to maintain ownership. If the user fails to play the required amount, the NFT may be placed back into circulation for purchase or winning. An NFT may be limited to a certain number of uses, e.g., N, wherein N is a number of games in which the asset underlying the NFT is used or a number of uses of the asset underlying the NFT. A user may elect to use an NFT N-M times and sell the remaining M uses to another player in the manner of a landlord renting a few uses of the NFT.

The asset underlying an NFT may be an exclusive skin or emote or other custom artwork or a game weapon or armor or trophy. The NFT may provide a means to unlock a skill for the owner unlock land ownership in a multi-player game as a means to alienate digital land. Continuing in this vein, if the NFT represents a digital gold mine, part of the digital gold represented by ownership of the mine may be sold, and ownership of the mine may be separated from ownership of the digital minerals within it just as land ownership may be severed from mineral or water rights in the land.

While the particular embodiments are herein shown and described in detail, it is to be understood that the subject matter which is encompassed by the present invention is limited only by the claims.

What is claimed is:

1. A system comprising:
    at least one computer medium that is not a transitory signal and that comprises instructions executable by at least one processor to:
    associate a time with at least one non-fungible token (NFT) establishing ownership of at least one digital asset, the time being associated with the NFT at least in part by indicating the time in metadata of the NFT and associating the metadata with the NFT, indication of ownership being effected at least in part by using a computer to add data to the metadata identifying at least one owner;
    process the NFT using a computer to, based at least in part on the time, automatically terminate the ownership; and
    offer the NFT for sale subsequent to terminating the ownership, the offer of the NFT for sale comprising sending plural advertisements via a computer game network to plural users that the NFT is available, the advertisements comprising at least one image related to the NFT and metadata comprising a list of prior owners of the NFT along with periods of time the respective prior owners possessed ownership of the NFT; and
    require a player acquiring ownership of the NFT to retain ownership of the NFT at least in part by playing at least one computer game a certain period of time, or by employing the digital asset in a future particular tournament or event, or both playing at least one computer game a certain period of time and employing the digital asset in a future particular tournament or event.

2. The system of claim 1, comprising the at least one processor.

3. The system of claim 1, wherein the instructions are executable to:
    present on at least one display at least one user interface (UI) comprising:
    an image of the digital asset; and
    an offer to own the NFT for a limited time.

4. The system of claim 1, wherein the instructions are executable to:
    present on at least one display at least one user interface (UI) comprising:
    a selection to indicate a user is a spectator and cost of owning the NFT is a first price;
    a selection to indicate a user is a game player and cost of owning the NFT is a second price.

5. The system of claim 1, wherein the instructions are executable to:
    present on at least one display at least one user interface (UI) comprising:
    an acceptance selector to indicate accepting terms of ownership of the NFT; and
    a selector to automatically extend ownership of the NFT past the time for a limited period.

6. The system of claim 1, wherein the instructions are executable to:
    present on at least one display at least one user interface (UI) comprising:
    at least one image of the digital asset; and
    notification of ownership of the digital asset.

7. The system of claim 1, wherein the instructions are executable to:
    present on at least one display at least one user interface (UI) comprising:
    notification at the elapse of the time that the NFT is back on the market for purchase.

8. The system of claim 1, wherein the instructions are executable to:
    present on at least one display at least one user interface (UI) comprising:
    an entry field to enter a bid for the NFT.

9. The system of claim 1, wherein the digital asset comprises a computer game asset.

10. The system of claim 9, wherein the computer game asset comprises digital artwork.

11. The system of claim 9, wherein the computer game asset comprises a computer game character.

12. The system of claim 1, wherein the instructions are executable to:
require a player acquiring ownership of the NFT to retain ownership of the NFT at least in part by playing at least one computer game a certain period of time.

13. The system of claim 9, wherein the computer game asset comprises a computer game event.

14. The system of claim 1, wherein the instructions are executable to offer the NFT to an offeree at a first price responsive to the offeree being a player of a computer game and offer the NFT at a second price responsive to the offeree being a spectator of the computer game.

15. The system of claim 1, wherein the instructions are executable for:
require a player acquiring ownership of the NFT to retain ownership of the NFT at least in part by employing the digital asset in a future particular tournament or event.

16. The system of claim 1, wherein the instructions are executable for:
require a player acquiring ownership of the NFT to retain ownership of the NFT at least in part by both playing at least one computer game a certain period of time and employing the digital asset in a future particular tournament or event.

* * * * *